United States Patent [19]

Garstick

[11] 3,878,306
[45] Apr. 15, 1975

[54] IMITATION MAPLE SIRUP
[76] Inventor: George A. Garstick, 1305 Brighton N.E., Warren, Ohio 44483
[22] Filed: Oct. 11, 1972
[21] Appl. No.: 296,512

[52] U.S. Cl. .............................................. 426/658
[51] Int. Cl. ............................................... A23l 1/08
[58] Field of Search ........... 426/213, 175, 218, 222, 426/342, 380, 520, 175, 213, 214, 217, 218, 222, 380

[56] References Cited
UNITED STATES PATENTS
752,359   2/1904   Reed .................................. 426/213
2,895,833   7/1959   Willits et al ......................... 426/380

OTHER PUBLICATIONS
Filipic, V. J., J. C. Underwood and C. J. Dooley, Vol. 34, (1969), Journal of Food Science, pages 105–110.

Primary Examiner—A. Louis Monacell
Assistant Examiner—R. A. Yoncoskie
Attorney, Agent, or Firm—Michael Williams

[57] ABSTRACT

An imitation maple sirup, having the appearance, consistency and taste substantially equal to pure maple sirup. The ingredients of the sirup comprise water, white sugar, brown sugar, and lemon and vanilla extract.

2 Claims, No Drawings

IMITATION MAPLE SIRUP

BACKGROUND AND SUMMARY

Many well known and advertised imitation maple sirups are now being sold on a commercial basis but, to experts, these sirups are easily distinguished from pure maple sirup. Experts who have tasted my improved imitation maple sirup have expressed the opinion that it is the closest approach to pure maple sirup that they have experienced.

My improved sirup is formulated from standard, quality materials, none of which, or a combination of which, may be considered harmful to the human system. The materials include such commonly available and accepted items as water, white and brown sugar, and lemon and vanilla extracts.

DISCLOSURE OF THE PREFERRED EMBODIMENT

I have formulated relatively small batches of my improved sirup since I have not had access to equipment necessary for large scale, commercial production; however, the proportions hereinafter given may be multiplied to produce larger batches and to effect the economy of commercial production.

The formula I have followed will produce about 3½ quarts of my improved sirup. This formula requires about 2 quarts of water, which may be either ordinary tap water or distilled water, and I have found distilled water is preferable.

The water, and white and brown sugar are placed in a container, such as a kettle, and I have found it preferable to use a stainless steel kettle for this purpose. The white sugar is preferably of the granulated type, and about 5 pounds is suitable for the amount of water above noted. The brown sugar is also preferably of the granulated type and further is preferably light brown sugar, and about 1 pound of this sugar is used.

The above ingredients are placed in the kettle and stirred until substantially blended. Heat is applied to the kettle either during or after blending, and the mixture is brought to the boiling point. During boiling, the mixture may be further stirred, if desired, and the lemon and vanilla extracts are added.

If the water used is distilled water, I have found it sufficient to add from 5 to 15 drops of pure lemon extract and from 30 to 90 drops of pure vanilla extract. Boiling is continued for a period of time, preferably in excess of an hour, and, in the batches I have prepared, the boiling was continued for about 1 hour and 15 minutes.

It has been established that pure maple sirup weighs about 11 pounds per gallon, and my improved sirup, made in accordance with the ingredients in the specific proportions above given, and boiled for the specific time given, will produce a sirup which weighs about 11 pounds per gallon, the same as pure maple sirup. If the mixture is boiled less than specifically disclosed, the sirup will be lighter in weight. Conversely, if it is boiled longer than disclosed, it will be heavier and will turn darker in color, and in this condition may be used as a topping for ice cream or for similar purposes.

Although it is preferred to use distilled water in the preparation of my improved sirup, ordinary tap water may be used. In such case, the amounts of water, white and brown sugar remain substantially the same, as is the boiling time. However, the amounts of lemon and vanilla extracts should be increased in the amounts dependent upon the analysis of the tap water. Of course, if the tap water comes from a source which is substantially as mineral free as distilled water, no increase need be made. However, the ordinary tap water contains minerals and bacteria-destroying chemicals, and for all practical purposes, I have found that the amount of pure lemon extract should be from 15 to 90 drops of lemon extract, and from 30 to 180 drops of vanilla extract.

In either case, the resulting sirup may be used immediately following the boiling operation, although it is preferred to let the sirup cool to room temperature, so that it may be more easily poured into containers for sale and subsequent use.

I claim:

1. An imitation maple sirup, comprising a boiled mixture of about 2 quarts of distilled water, about 5 pounds of granulated white sugar, about 1 pound of granulated light brown sugar, about 5 to 15 drops of pure lemon extract and about 30 to 90 drops of pure vanilla extract to give a final batch of about 3½ quarts of sirup.

2. An imitation maple sirup, comprising a boiled mixture of about 2 quarts of tap water, about 5 pounds of granulated white sugar, about 1 pound of granulated light brown sugar, about 15 to 90 drops of pure lemon extract and about 30 to 180 drops of pure vanilla extract to give a final batch of about 3½ quarts of sirup.

* * * * *